EXAMINER
51
2,875,437
451,318

Feb. 24, 1959 L. L. GEORGE, JR 2,875,437

BROADBAND ACTIVE TYPE RECEIVING ANTENNA MULTICOUPLER

Filed Aug. 20, 1954 2 Sheets-Sheet 1

INVENTOR.
LOUIS L. GEORGE, JR.
BY George Sipkin
George E. Pearson
ATTORNEYS

Feb. 24, 1959 L. L. GEORGE, JR 2,875,437

BROADBAND ACTIVE TYPE RECEIVING ANTENNA MULTICOUPLER

Filed Aug. 20, 1954 2 Sheets-Sheet 2

INVENTOR.
LOUIS L. GEORGE, JR.
BY George Sipkin
George E. Pearson
ATTORNEYS 2,875,437
Patented Feb. 24, 1959

2,875,437

BROADBAND ACTIVE TYPE RECEIVING ANTENNA MULTICOUPLER

Louis L. George, Jr., San Diego, Calif.

Application August 20, 1954, Serial No. 451,318
4 Claims. (Cl. 343—205)
(Granted under Title 35, U. S. Code (1952), sec. 266)

The invention described herein may be manufactured and used by or for the Government of the United States of America for governmental purposes without the payment of any royalties thereon or therefor.

This invention relates to a method and apparatus for operating a plurality of radio receivers from one antenna without degradation in performance due to interference therebetween and more particularly to the provision of a broadband active type receiving antenna multicoupler for receiving desired radio signals without degradation in performance caused by simultaneous application of very strong interference radio signals applied at the input terminals.

The multicoupler of this invention employs in each receiver channel a push-pull cathode follower power amplifier stage having a broadband R. F. transformer connected in the cathode circuit. The signal input to the cathode follower stage is supplied by an artificial transmission line. Each stage provides a signal output to one radio receiver, additional receivers having additional cathode follower stages properly connected to the transmission line. The output impedance of the cathode circuit is made equal to the value of the receiver input impedance connected to it. The radio receiver is connected directly to the output winding of the cathode follower output transformer. The total equipment weight including the self-contained power supply is 38 pounds and the power consumption is 100 watts.

Previous known devices have utilized either a conventional two stage broadband amplifier having little or no protection against very strong interference input signals or an artificial transmission line supplying push-pull signals to cathode follower circuits, the outputs of which are fed to a push-pull grounded grid power amplifier stage having a transformer coupled output. Reception of desired radio signals with the first device is seriously degraded by very strong interference signal voltages, producing high distortion, signal attenuation, and generating undesirable spurious output signal frequencies. The equipment of the latter device is heavier (approximately 120 pounds) and requires much more primary power for operation (approximately 500 watts).

The apparatus of the present invention provides reception of radio signals without serious degradation caused by strong interference of up to 40 volts being simultaneously applied to the multicoupler input terminals. Additional amplifier stages have been eliminated and the circuitry simplified such that weight, size, and total power consumption have been considerably reduced, while the electrical performance and equipment reliability is equal to, or better than, that obtained with previous devices.

An object of the present invention is the provision of an improved antenna multicoupler capable of receiving desired radio signals without serious degradation in performance caused by simultaneous application of very strong interference radio signals applied at input terminals.

Another object is the provision of an antenna multicoupler of less size, weight, and power consumption than previous known devices.

Another object of the present invention is the provision of an antenna multicoupler of increased reliability and simplicity in design.

Other objects and many of the attendant advantages of this invention will be readily appreciated as the same becomes better understood by reference to the following detailed description when considered in connection with the accompanying drawings wherein.

Figure 1:
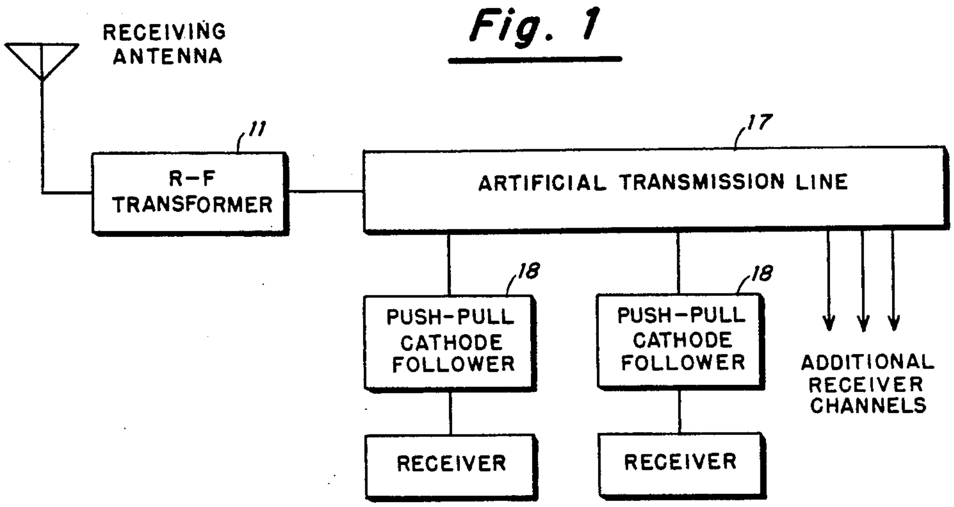
Fig. 1 shows a block diagram of the antenna multicoupler system.

When it is desired to operate several radio receivers simultaneously and receive signals of various frequencies, a problem immediately arises as to the number of antennas that must be provided. Wherever many receivers may be in operation at one time—at receiving stations on ships as well as at shore installations—the number of antennas required may become excessive. On most ships the space available for antennas is severely limited. Furthermore, several antennas in close proximity interact upon one another because of their mutual impedances. Such interaction may result in severe distortion of the field patterns and hence cause poor reception at one or more null points.

Receiving multicouplers are designed to alleviate this condition by (1) permitting several receivers to be operated from one antenna, and (2) providing sufficient isolation between receivers so that interaction between them is negligible. It is possible to devise many forms of receiving multicouplers, each kind having some particular advantage over the others; for each advantage, however, a certain price must be paid in the electrical performance and/or operating characteristics. Active-type multicouplers, employing vacuum tubes, amplify the signal and supply the signal power required for each receiver connected to them. The passive types, not using vacuum tubes, must necessarily divide the original signal power among all the receivers used with them.

Engineering evaluations made of several active receiving-antenna multicoupler equipments designed for shore or ship installations have emphasized the most usual defect or limiting condition—the production of spurious responses. In shipboard operation, where transmitting antennas are in close proximity to the receiving antennas, severe overload may occur because of strong local-transmitter signals present on the receiving antenna. When the transmitter is keyed, a desired signal being received may become diminished in amplitude as well as subject to possible interference caused by receiver spurious responses. Under this condition the quality of reception is seriously degraded.

No selectivity is provided in the usual active types of multicouplers, since by design they constitute broadband R. F. amplifiers. As a consequence they can produce spurious responses when two or more signals are simultaneously present at the input. These spurious signals are the intermodulation products of the combining signals.

One method for measuring amplitudes of spurious signals is to apply one weak signal—of the order required for standard receiver output (6 milliwatts, 600 ohms, 20-db S/N ratio)—and one very strong signal—of amplitude sufficient (usually 4 to 10 volts) to produce standard output when the receiver is tuned to a particular spurious-response frequency. The ratio of the two input amplitudes is then expressed in decibels. While this method includes signal levels most likely to be encountered in practical use, it neglects the harmonic output of the multicoupler that is present because of the high signal level and the nonlinearity of the circuit. The multicoupler will act as a harmonic generator to an extent depending upon the degree of its non-linearity. These harmonically related output frequencies can then combine with the fundamental or harmonic frequencies of the receiver local oscillator, giving rise to a large number of "birdies" or spurious receiver outputs.

The magnitude of the receiver-spurious-response outputs created by this latter condition of harmonic generation is far more serious than of those represented by the previously discussed condition and is believed to be more representative of conditions met in practice aboard ship. Measurement of multicoupler harmonic output as a function of single-frequency input level gives the degree of nonlinearity and yields quantitative data on harmonic-output amplitude. Whether these levels will cause interference or not is dependent upon the magnitude of the desired signal input. For example, spurious signal inputs (either from a multicoupler or because of transmitter harmonic output) to a receiver having a sensitivity of 3 microvolts and a spurious-frequency rejection ratio of 80 db must be at least 30,000 microvolts in order to produce standard output.

The approach to this problem was based on the consideration that any suitable multicoupler design must have an extremely linear input-output voltage characteristic so that the harmonic output would be as low as possible. The most exacting requirement is that strong interference-signal levels of 40 volts applied to the multicoupler input shall not cause more than a 3-db overload (attenuation of a desired signal). Finally, it was also desired to have provision for operation at lower frequency ranges.

It was considered difficult to design any broadband amplifier to have a maximum-output harmonic distortion of less than 1 percent, in view of the fact that this degree of performance would probably require selected tubes and circuits, leading to possible degradation in performance when the tubes were replaced. Even if such an amplifier could be satisfactorily produced, an output of 1 percent of a 40-volt input signal (attenuated approximately 6 db because of insertion loss) is 200,000 microvolts, a signal of considerable magnitude. It is worth noting that, even if a multicoupler were perfectly linear (that is, had no harmonic output), the probable harmonic content of the strong input signal itself would cause many receiver "birdies." Receiver overload would also result to a degree dependent upon the frequency separation between the desired and the interfering signals.

Figure 2:
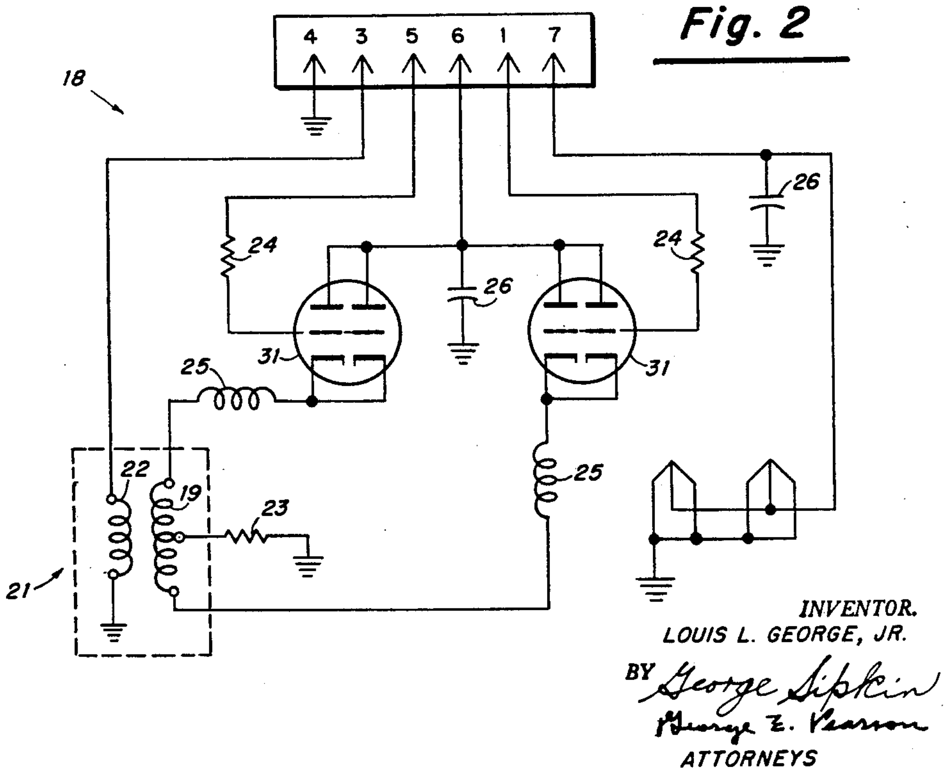
Fig. 2 shows a schematic diagram of the push pull cathode follower stage.

The push-pull cathode-follower circuit, as shown in Fig. 2, yields maximum output consistent with minimum distortion levels for active multicoupler application. The complete block diagram of the antenna multicoupler system is shown in Fig. 1, while Fig. 2 and Fig. 3 show the complete schematic diagram.

Figure 3:
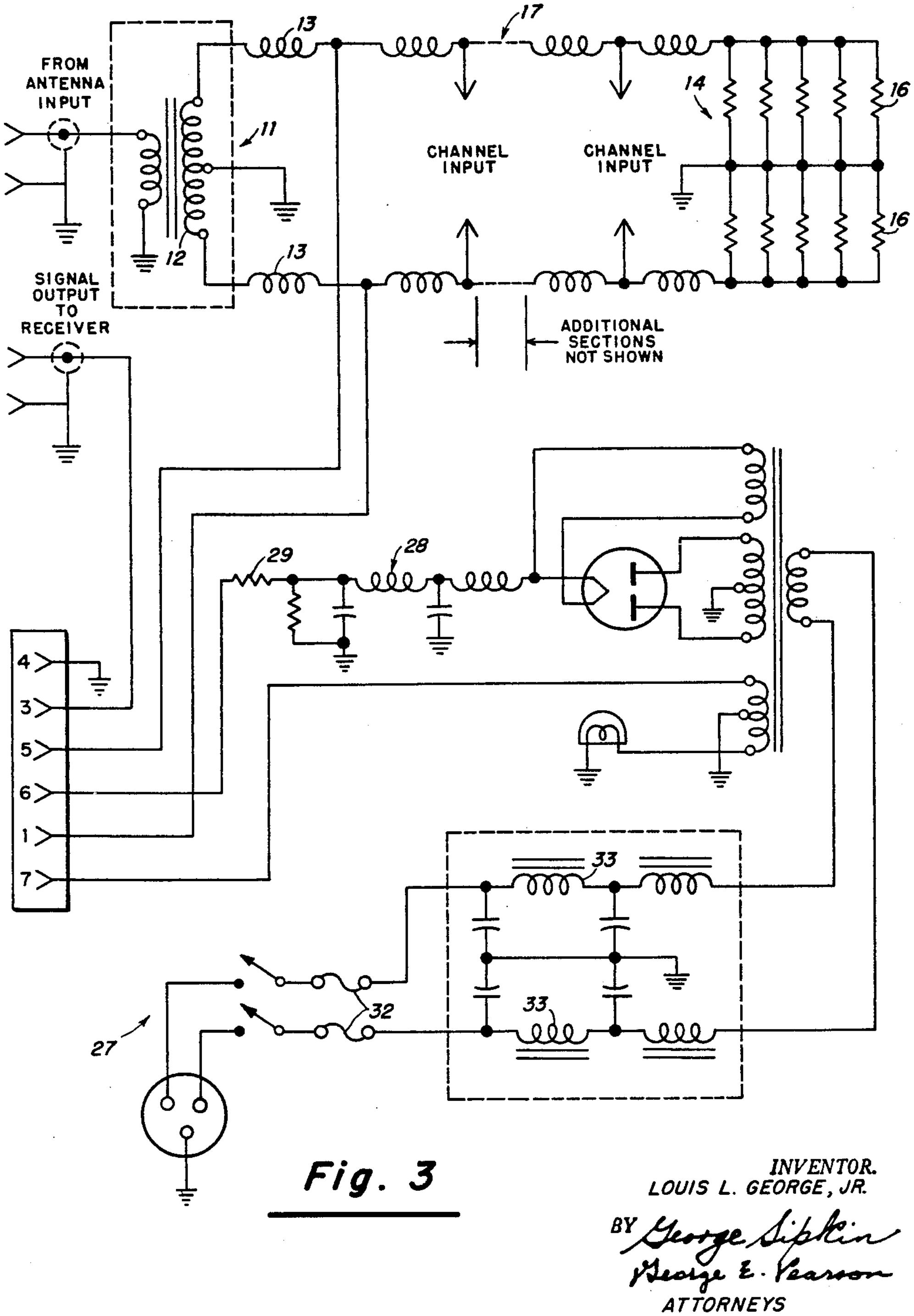
Fig. 3 shows a schematic diagram of the artificial transmission line and power supply.

Referring now more specifically to Figs. 1, 2, and 3, signal energy from the receiving antenna is first applied to the 70 ohm input transformer 11 where the level is stepped up approximately 3 db to an impedance level of 600 ohms. The secondary winding 12 of the transformer 11 is balanced to ground and feeds a push-pull signal voltage to a lowpass artificial transmission line composed of lumped inductances 13 and capacitances. The latter are provided by the input capacity of each receiver channel. The transmission line is terminated at its receiving end with a noninductive 600-ohm resistance 14 (the value of the characteristic impedance of the line). This resistance is composed of two sections 16 of five 1500-ohm, 2-watt carbon resistors in series, grounded at the midpoint. The maximum signal-power dissipation is therefore 20 watts.

Push-pull signal voltage, provided by the artificial line 17, is applied to the grid circuit of the push-pull cathode-follower stage 18. Signal output voltage is developed across the center-tapped primary winding 19 (approximately 600 ohms) of the output transformer 21 and then stepped down in level in the secondary output winding 22 of approximately 70 ohms. Operating grid bias is obtained by means of the common 220-ohm, 2-watt cathode resistor 23. The 2-watt dissipation rating is required because of the increase in average plate current that results when strong interference signals are present at the multicoupler input. Series grid resistors 24 of 82 ohms, 1 watt, are employed to prevent circuit oscillation caused by probable cathode-follower negative input resistance at some frequencies. The plate and filament leads in each channel are bypassed to chassis with 0.01-microfarad capacitors 26. $D_1$ small r. f. chokes 25 form a filter with the stray circuit capacity and enables an increased frequency response to be obtained.

The power supply 27 is conventional in design, employing a two-section choke-input filter 28. A fixed resistance 29 of 200 ohms in series with the plate-voltage lead serves to limit automatically the plate dissipation of the 12AU7 tubes 31 when strong interference signals of 40 volts are present at the multicoupler input terminals. Each side of the power line is fused at 32 and includes an r. f. filter 33. As shown in Fig. 2 and Fig. 3, the push-pull cathode-follower stage is readily removable as a unit so that it may be easily replaced without undue delay.

*Analysis of circuit operation*

In analyzing the circuit operation the following symbols are used:

$f_c$=cut-off frequency
$C$=capacitance per section
$E_c$=voltage between cathode and ground
$E_i$=voltage developed between each side of the artificial transmission line and ground
$E_o$=output voltage
$E_s$=input voltage
$G$=cathode-follower gain
$G_m$=transconductance
$L$=inductance per section
$Z_c$=primary impedance of output transformer
$Z_o$=desired output impedance
$Z_1$=input-transformer primary impedance
$Z_2$=input-transformer secondary impedance
$\omega$=angular frequency The voltage $E_i$ developed between each side of the artificial transmission line and ground, when a coupling factor of unity is assumed, is given by $$E_i=\frac{E_s\sqrt{Z_2}}{2\sqrt{Z_1}} \quad (1)$$

The push-pull voltage developed across $Z_2$ is then applied to a lowpass balanced artificial transmission line having a characteristic impedance equal to $Z_2$. When each half of the line is considered separately, then for T sections, $$\frac{Z_2}{2}=\sqrt{L/C-\frac{(\omega L)^2}{4}} \quad (2)$$

Equation 2 shows that the characteristic impedance of the line decreases as the frequency increases. The characteristic impedance becomes zero at the cut-off frequency given by $$f_c=\frac{1}{\pi\sqrt{LC}} \quad (3)$$

Because of the push-pull voltage applied to the cathode circuit, the voltage developed across the primary impedance $Z_c$ of the output transformer is $2E_c$. The value of $E_c$, in terms of $E_i$ and $Z_c$, may be determined by applying the usual cathode-follower gain equation $$E_c=E_iG=\frac{E_iG_m\frac{Z_c}{2}}{1+\frac{G_mZ_c}{2}}$$

$$E_c=\frac{E_iG_mZ_c}{2+G_mZ_c} \quad (4)$$

When (1) is substituted in (4), $$E_c=\frac{E_sG_mZ_c\sqrt{Z_2}}{2\sqrt{Z_1}(2+G_mZ_c)} \quad (5)$$

The output voltage developed across the output-transformer-loaded secondary winding, when unity coupling factor is again assumed, is $$E_o=\frac{2E_c\sqrt{Z_o}}{\sqrt{Z_c}} \quad (6)$$

where $Z_o$ is the desired output impedance. When (5) is substituted in (6), $$E_o=\frac{E_sG_m\sqrt{Z_cZ_oZ_2}}{\sqrt{Z_1}(2+G_mZ_c)} \quad (7)$$

Equation 7 gives the output voltage as a function of all the circuit parameters. The insertion loss of the transmission channel, from input to output, is $$\text{db}=20\log\frac{E_s}{E_o}=20\log\left[\frac{\sqrt{Z_1}(2+G_mZ_c)}{G_m\sqrt{Z_cZ_oZ_2}}\right] \quad (8)$$

When all circuit parameters are held constant, Equation 7 may be differentiated with respect to $Z_c$ and equated to zero to find its optimum value and corresponding minimum insertion loss, as follows:

$$\frac{dE_o}{dZ_c}=2+G_mZ_c-2Z_cG_m=0$$

$$2-G_mZ_c=0 \quad (9)$$

and $$Z_c=\frac{2}{G_m}$$

Equation 9 shows that minimum insertion loss occurs when the impedance presented to each cathode is equal in value to the reciprocal of the operating transconductance. When $Z_c=2/G_m$ is substituted in Equation 7, $$E_o=\frac{E_s\sqrt{2Z_oZ_2G_m}}{4\sqrt{Z_1}} \quad (10)$$

Equation 10 shows that when the optimum cathode load is used, the output voltage varies as the square root of the transconductance.

Several modifications readily become apparent. For example, a 2.3-db improvement in insertion loss should result if the artificial line impedance is increased from the present value of 600 ohms to 1000 ohms. This improvement, however, will result in poorer overload characteristics of the order of an additional 2 to 4 db.

It may be possible to eliminate one power-supply D. C. choke and reduce the total equipment weight by about 5 to 6 pounds.

The number of output channels can be doubled without increasing the capacity of the power supply, merely by decoupling each output with two 70-ohm resistors and tolerating a 6-db additional insertion loss. The isolation between two receivers so connected to one output channel should be approximately 15 db. The resistor 14 may be made of a single resistor having a sufficient power dissipation rating. Also, the multicoupler can be operated at lower frequency ranges by employing plug-in R. F. input and output transformers designed for those ranges. Other modifications and variations of the present invention are possible in the light of the above teachings. It is therefore understood that within the scope of the appended claims, the invention may be practiced otherwise than as specifically described.

What is claimed is:

1. Apparatus for operating a plurality of radio receivers from a single antenna without interaction between the receivers and with a minimum of interference and overload caused by interference signals comprising, in combination, an antenna circuit, an artificial transmission line circuit connected thereto and having suitable electrical outlets for connecting other circuits to said transmission line circuit, a cathode-follower stage including a pair of grid controlled tubes connected to each of said outlets, a transformer for each stage having the ends of a center tapped primary winding connected respectively to the cathode circuit of each tube through a small radio frequency choke for forming a filter with the stray circuit capacity and provide an improved frequency response, and a grid bias provided by a common cathode resistor connected to the said center tap of the primary.

2. A receiving multicoupler for connecting a single antenna to a plurality of receiving sets comprising, in combination, an artificial transmission line adapted to be connected to said antenna at one end and terminating at the other end with a resistance equal to the value of the characteristic impedance of said line, pairs of points along said line suitable for electrical connection with other circuits, a push-pull cathode-follower stage connected to each of said pairs of points, said stage comprising a pair of cathode-follower tubes having at least a plate, grid, cathode and heater element therefore respectively, a circuit oscillation prevention resistor, connecting the grid of one tube to one of said pairs of points and a circuit oscillation prevention resistor connecting the grid of the other tube to the other of said pair of points, the plates of said tubes connected in parallel, an automatic plate dissipation limiting resistor connecting said plates to a power supply, said heater elements also being connected to a suitable power supply, capacitors bypassing the plate and heater elements to ground, an output transformer, the cathodes of said tubes connected to the ends of the primary winding thereof, the secondary winding of said transformer forming the outlet of said stage for connection with a radio receiving set.

3. A receiving multicoupler for connecting a single antenna to a plurality of receiving sets comprising, in combination, an artificial transmission line connected to said antenna, a plurality of receiver channels connected to said transmission line, a push-pull cathode follower stage connected to each of said channels, each stage comprising a pair of grid controlled tubes connected to each channel, a transformer for each stage, the primary winding of said transformer connected to the cathode circuit of each tube, the secondary winding of said transformer connected to the input of a receiver set connected to said stage.

4. A receiving multicoupler comprising a transmission line and a plurality of push-pull cathode-follower stages connected thereto, each of said stages comprising a pair of grid controlled tubes connected to said line through a circuit oscillation prevention resistor, an automatic plate dissipation limiting resistor connecting the plates of said tubes to a suitable source of current, and transformer loading of the cathode circuit, the secondary winding of the transformer being the outlet for connection with a radio receiver set.

References Cited in the file of this patent

UNITED STATES PATENTS

| | | |
|---|---|---|
| 2,578,836 | Potter | Dec. 18, 1951 |
| 2,648,727 | Rockwell | Aug. 11, 1953 |
| 2,704,791 | Koch | Mar. 22, 1955 |

FOREIGN PATENTS

| | | |
|---|---|---|
| 966,382 | France | Oct. 9, 1950 |